United States Patent [19]

Vogan

[11] Patent Number: 4,905,452
[45] Date of Patent: Mar. 6, 1990

[54] EASY-OPEN FLEXIBLE POUCH AND APPARATUS AND METHOD FOR MAKING SAME

[75] Inventor: Dennis J. Vogan, Etobicoke, Canada

[73] Assignee: W. R. Grace & Co., Duncan, S.C.

[21] Appl. No.: 351,364

[22] Filed: Jun. 26, 1989

Related U.S. Application Data

[62] Division of Ser. No. 254,992, Oct. 7, 1988, Pat. No. 4,861,414, which is a division of Ser. No. 109,673, Oct. 16, 1987, Pat. No. 4,808,010.

[51] Int. Cl.⁴ .............................................. B65B 61/18
[52] U.S. Cl. ......................................... 53/412; 53/451; 53/479
[58] Field of Search ................. 53/410, 412, 451, 479, 53/133, 373, 551, 552, 554, 555; 156/251, 515, 530, 553, 583.1, 583.4; 493/203, 209, 237, 923, 930, 963

[56] References Cited

U.S. PATENT DOCUMENTS

| | | | |
|---|---|---|---|
| D. 138,697 | 9/1944 | Salfisberg | 206/484 X |
| 2,230,849 | 2/1941 | Salfisberg | 206/46 |
| 2,329,360 | 9/1943 | Salfisberg | 229/51 |
| 3,155,282 | 11/1964 | Leblanc | 222/107 |
| 3,184,121 | 5/1965 | Volckening | 222/213 |
| 3,234,069 | 2/1966 | Saas | 53/552 |
| 3,278,085 | 10/1966 | Brown | 222/107 |
| 3,510,054 | 5/1970 | Sanni et al. | 229/66 |
| 4,147,583 | 4/1979 | Deutschlander | 53/133 X |
| 4,506,494 | 3/1985 | Shimoyama et al. | 53/551 |
| 4,582,555 | 4/1986 | Bower | 493/203 X |
| 4,682,976 | 7/1987 | Martin | 493/203 X |
| 4,795,271 | 1/1989 | Lane | 53/412 |

FOREIGN PATENT DOCUMENTS

| | | |
|---|---|---|
| 109965 | 6/1984 | European Pat. Off. . |
| 0148181 | 2/1987 | United Kingdom . |

*Primary Examiner*—John Sipos
*Attorney, Agent, or Firm*—John J. Toney; William D. Lee, Jr.; Mark B. Quatt

[57] ABSTRACT

A pouch and a method and apparatus for forming an easy open pouch in a vertical form-fill-seal process wherein a pouch is formed from a sheet of thermoplastic film and a heat seal between pouches as they are filled serves as the top closure for the lower pouch and a bottom closure for the upper pouch, the easy open feature being provided by a U-shaped portion having a plurality of seal ribs, and a tear initiation notch.

1 Claim, 2 Drawing Sheets

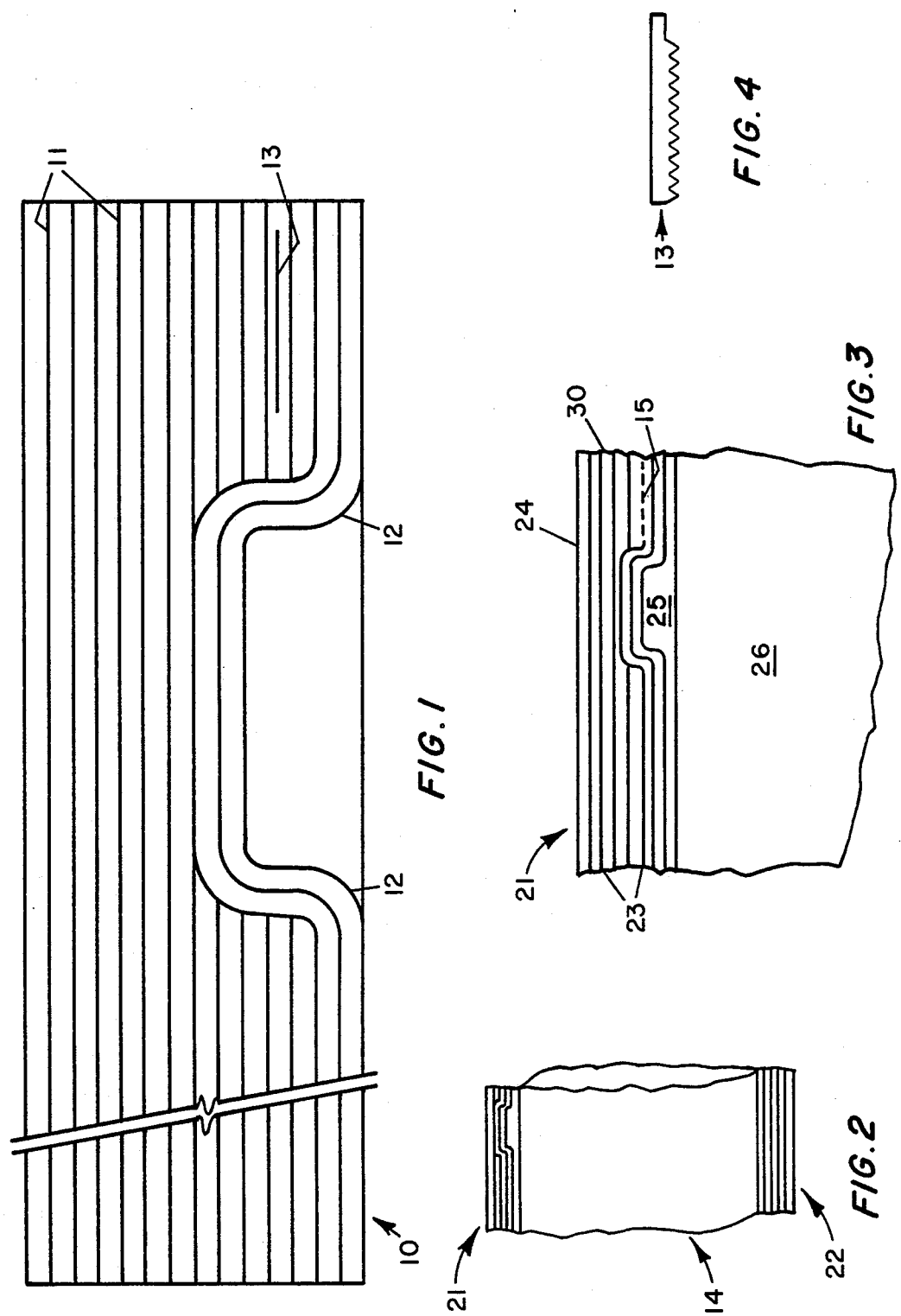

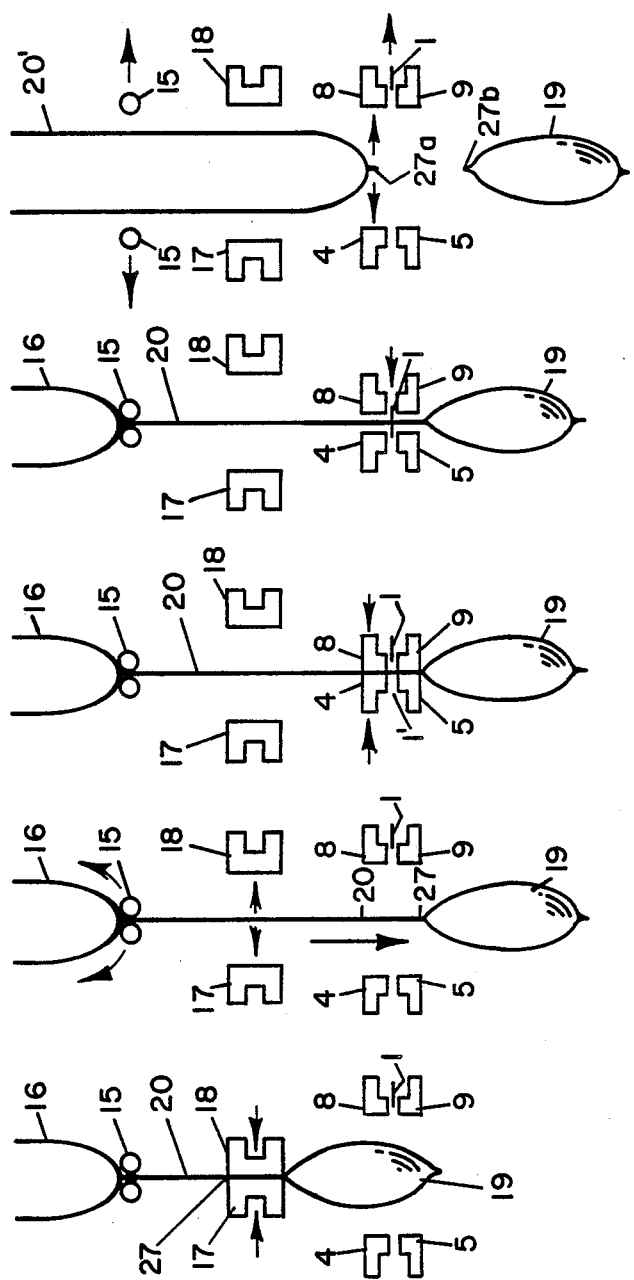

EASY-OPEN FLEXIBLE POUCH AND APPARATUS AND METHOD FOR MAKING SAME

This is a divisional application of application Ser. No. 254,992, filed on Oct. 7, 1988, now U.S. Pat. No. 4,861,414 which is a divisional application of the parent application Ser. No. 109,673, filed Oct. 16, 1987 which has issued as U.S. Pat. No. 4,808,010.

FIELD OF THE INVENTION

This invention relates to a bag or pouch and a method and apparatus for forming said bag in a form-fill-seal process. Particularly, the invention relates to a method and apparatus for providing a pouch closed with a guided tear, easy open seal so that the bag may be readily opened without resort to a knife or scissors.

BACKGROUND OF THE INVENTION

In the field of packaging food and non-food liquid and/or flowable food and non-food products, a convenient method of packaging such products in thermoplastic film has been developed and is generally known as a form-fill-seal process. In such a process a tube is formed from thermoplastic film and the bottom end seal is made by transversely sealing across the tube with heated seal bars to form a conveniently wide heat seal and, consequently, producing a bag or pouch ready to receive a product. After the heat seal is made, the bag or pouch is filled and then another transverse heat seal is made across the width of the tube in a relatively wide band. After cooling, this seal is transversely severed to separate the fill bag from the next bag to be filled. Thus, one wide band seal serves as the bottom seal for one bag and the top seal for another.

A machine for making bags in a vertical form-fill-seal machine is described in U.S. Pat. No. 4,506,494 which issued on Mar. 26, 1985 to Mamoru Shimoyama et al. In the Shimoyama patent a vertically held tube with a bottom end that has been closed by a transverse heat seal is filled with a liquid, semiliquid, or paste charge or contents and squeeze rollers spaced apart and above the bottom end seal squeeze the filled tube and pinch the walls of the flattened tube together. When a length of tubing of the desired height of the bag has been fed through the squeeze rollers a heat seal is made transversely across the flattened tubing by heat seal bars which clamp and seal the film of the tube therebetween. After the seal bars have been withdrawn the film moves downwardly to be contacted by cooled clamping and severing bars which clamp the film therebetween and are provided with a cutting knife to sever the sealed film at about the mid point of the seal so that approximately half of the seal will be on the upper part of a tube and the other half on the lower. When the sealing and severing operation is complete, the squeeze rollers are separated to allow a new charge of product to enter the flattened tube after which the aforementioned described process is repeated thus continuously producing vertically form-fill-seal bags which have a bottom end and top end heat seal closure.

One of the drawbacks of such sealed bags is that the heat seal which is of flattened, relatively strong and tough thermoplastic film is made even stronger and tougher by the fact that it is now a two-ply heat welded band which requires a knife or scissors or other device to open the pouch. Accordingly, it is one object of the present invention to provide an apparatus, a pouch, and method for making same which produces a manually operable guided tear, easy open seal.

Another object of the present invention is to provide a pouch with an easy open feature wherein the easy open feature does not detract or injure the package quality nor affect the contents of the package.

Yet another object of the present invention is to provide a convenient and efficient way of making an easy open pouch which can be incorporated into existing form-fill-seal bag making equipment.

These and other objects will be readily apparent to those skilled in the art from the following Summary of the Invention, Description of the Drawings, and Detailed Description.

SUMMARY OF THE INVENTION

In one aspect, the present invention comprises a pouch formed from a tube of thermoplastic material comprising a first transverse heat seal closing a first end of said tube, a second transverse heat seal closing a second end of said tube, each hear seal being a heat-sealed band extending transversely across the width of the bag, and the first heat seal including a plurality of parallel, spaced-apart seal ribs disposed in a substantially U-shaped arrangement along a portion of the heat seal.

In another aspect, an apparatus for producing an easy-open seal for a flexible pouch comprises a seal bar having a plurality of parallel spaced-apart ribs disposed in a substantially U-shaped arrangement along a teeth, said blade dispose parallel to the long dimension of the said seal bar, portion of the seal bar; and a straight blade having an edge of sharpened between the U-shaped portion of the seal rib arrangement and a side edge of the seal bar, and intermediate the height of the U-shaped portion.

In still another aspect, in the vertical form-fill-seal method of making and filling a pouch by forming a tube from thermoplastic film, transversely heat sealing the tube to close its bottom end, filling the tube, transversely heat sealing across the tube at a preselected spacing then cooling the seal and transversely severing the seal approximately the midpoint of the vertical width of the seal to separate a lower, filled pouch from a next or upper pouch, the improvement which comprises the steps of forming a plurality of parallel, spaced apart seal ribs disposed in a substantially U-shaped arrangement along a portion of the heat seal, and, simultaneously with step (a), making a series of notches in the seal of the upper pouch and in the seal of the lower pouch, each of said series of notches extending from a side edge of the pouch towards the U-shaped portion of the seal.

DESCRIPTION OF THE DRAWINGS

In the drawings which are appended hereto and made a part of this disclosure:

FIG. 1 is a representation of a preferred seal bar according to the present invention;

FIG. 2 shows a typical pouch produced by a vertical form-fill-seal process with the preferred easy open feature of the present invention in the seal area thereof;

FIG. 3 represents blown up segment of the pouch of FIG. 2 showing the guided tear initiation notch of, the present invention;

FIG. 4 shows a means for creating a tear initiation notch; and

FIGS. 5-9 are schematic representation of the successive steps of the sealing and severing process according to the present invention.

DETAILED DESCRIPTION

FIG. 1 shows the front face detail of the preferred apparatus. The seal bar 10 has a series of parallel, spaced-apart ribs 11, with a plurality of ribs 11 forming a central, U-shaped portion 12. A straight blade segment 13 having an edge of sharp teeth is disposed along one side of the U-shaped portion 12. Blade segment 13 can be of any suitable arrangement as long as it will work, in conjunction with seal bar 10, to provide tear initiation notches or perforations in a pouch.

FIGS. 2 and 3 show a preferred pouch of the present invention wherein the pouch 14 is filled with product or contents 26 and has a tear initiation notch 15. Seals 21 and 22 are the relatively wide heat seal bands and the ribbed seal 21 is formed by the plurality of ribs 23 in the surface. As shown in FIG. 3 when tear 24 which is the portion of the heat seal extending outwardly from the tear initiation notch 15 is manually gripped and pulled to the left the seal will tear along the line which is approximated by the notch 15, and extend through U-shaped portion 25 to open a part of the pouch to make it a very convenient and easy way to dispense the contents of the pouch. At least two and preferably three seal ribs are provided in the U-shaped portion or central divot of the pouch which contains the contents 26 thereby providing a secure seal in preventing inadvertent opening or tearing of the pouch.

FIG. 4 is another view of blade segment 13.

Turning now to FIGS. 5-9 the process or method of the present invention will be described. The tube 16 can be either a seamless tube or preferably is a tube formed from a sheet of flattened film by a longitudinal seal. The film material is preferably a relatively strong, heat sealable film having good seal strength and if extended shelf life of the contents is desired, the film may have gas barrier properties. The tube 16 as shown in FIG. 5 is clamped by squeeze roller 15 and has been filled with a charge of liquid or semiliquid or pastelike contents. Below the squeeze rollers 15 is a flattened portion of the tube 20 which is being sealed by a pair of seal bars 17 and 18 which are heated to the heat welding temperature of the particular thermoplastic film from which the film is formed. These bars make the relatively wide band seal transversely across the tube and the tear initiation notch 15 and U-shaped portion 25. This seal forms the top or upper end seal for the lower or filled pouch 19 and will also form the lower or bottom end seal for the next to be formed pouch.

In FIG. 6 the seal bars 17 and 18 have been withdrawn and the squeeze rollers 15 have been rotated to feed off an additional length of flattened tubular film 20 so that the sealed band 27 is now in a position between the cooling and severing bars 4, 5 and 8, 9.

In FIG. 7 the cooling bar pairs 4, 5 and 8, 9 have been advanced to the seal 27 and clamp and hold the seal at this point thereby cooling the seal. Blade 1 is held by a pneumatic cylinder (not shown) to fire it through the passageway 1' and return while the film is clamped and being cooled.

In FIG. 8 the cutting knife has been fired and is shown severing the seal 27 at approximately its midpoint thereby severing the pouch 19.

In FIG. 9 the pouch 19 has been severed and is to be removed, the seal bar pairs 4, 5 and 8, 9 with the knife 1 have been withdrawn and the squeeze rollers 15 have been separated to allow a new charge of film to come into what was flattened tube 20 but is now tube 20' opened as a pouch to receive the charge of product. The bottom of the next pouch is sealed by seal 27A which is the segment of seal area 27 and the top of pouch 19 is closed by seal segment 27B.

It is to be understood that variations and modifications of the present invention may be made without departing from the scope of the invention. It is also understood that the scope of the invention is not to be interpreted as limited to the specific embodiments disclosed herein, but only in accordance with the appended claims when read in light of a foregoing disclosure. The detailed description of the preferred embodiment is given by way of illustration only since numerous changes and modifications well within the spirit and scope of the invention could become apparent to those already skilled in the art in view of the description herein.

Having thus described my invention, what is claimed is:

1. In the vertical form-fill-seal method of making and filling a pouch by forming a tube from thermoplastic film, transversely heat sealing the tube to close its bottom end, filling the tube, transversely heat sealing across the tube at a preselected spacing to form an upper seal for the filled bag then cooling the seal and transversely severing the seal approximately the midpoint of the vertical width of the seal to separate a lower, filled pouch from a next or upper pouch, the improvement which comprises the steps of:
    (a) forming a plurality of parallel, spaced apart seal ribs disposed in a substantially U-shaped arrangement along a portion of said upper heat seal around a U-shaped unsealed area; and
    (b) simultaneously with step (a), making a series of notches within the seal ribs of said upper seal, said series of notches extending from a side edge of the pouch towards the U-shaped unsealed area of the seal intermediate the height of the U-shaped portion.

* * * * *